United States Patent
Amine et al.

(10) Patent No.: US 7,473,491 B1
(45) Date of Patent: Jan. 6, 2009

(54) ELECTROLYTE FOR ELECTROCHEMICAL CELL

(75) Inventors: Khalil Amine, Downers Grove, IL (US);
Robert C. West, Madison, WI (US);
Zhengcheng Zhang, Madison, WI (US);
Bookeun Oh, Lisle, IL (US)

(73) Assignee: Quallion LLC, Sylinar, CA (US)

( * ) Notice: Subject to any disclaimer, the term of this patent is extended or adjusted under 35 U.S.C. 154(b) by 821 days.

(21) Appl. No.: 10/663,024

(22) Filed: Sep. 15, 2003

Related U.S. Application Data

(63) Continuation-in-part of application No. 10/663,023, filed on Sep. 15, 2003, now abandoned.

(51) Int. Cl.
*H01M 6/14* (2006.01)
*H01M 6/18* (2006.01)

(52) U.S. Cl. .................. 429/303; 429/188; 429/302; 429/313

(58) Field of Classification Search .......... None
See application file for complete search history.

(56) References Cited

U.S. PATENT DOCUMENTS

| | | | |
|---|---|---|---|
| 3,172,899 A | 3/1965 | Bailey | |
| 3,530,159 A | 9/1970 | Guinet et al. | |
| 3,734,876 A | 5/1973 | Chu | |
| 4,259,467 A | 3/1981 | Keogh et al. | |
| 4,830,939 A | 5/1989 | Lee et al. | |
| 4,849,856 A | 7/1989 | Funari et al. | |
| 4,908,283 A | 3/1990 | Takahashi et al. | |
| 5,037,712 A | 8/1991 | Shackle et al. | |
| 5,112,512 A | 5/1992 | Nakamura | |
| 5,272,021 A | 12/1993 | Asai et al. | |
| 5,300,375 A | 4/1994 | Chaloner-Gill | |
| 5,362,493 A | 11/1994 | Skotheim et al. | |
| 5,419,984 A | 5/1995 | Chaloner-Gill et al. | |
| 5,475,127 A | 12/1995 | Klein et al. | |
| 5,538,812 A | 7/1996 | Lee et al. | |
| 5,593,787 A | 1/1997 | Dauth et al. | |
| 5,609,974 A | 3/1997 | Sun | |
| 5,633,098 A | 5/1997 | Narang et al. | |

(Continued)

FOREIGN PATENT DOCUMENTS

EP  0 450 981 A1  10/1991

(Continued)

OTHER PUBLICATIONS

Y. Kang et al., Solid Polymer Electrolytes based on Cross-linked Siloxane-g-oligoethylene oxide: Ionic conductivity and Electrochemical Properties, Abstract book of 11th International Meeting on Lithium Batteries (1MLB 11), Jun. 23-28, 2002.

(Continued)

*Primary Examiner*—Susy Tsang-Foster
*Assistant Examiner*—Alix Echelmeyer
(74) *Attorney, Agent, or Firm*—Gavrilovich, Dodd & Lindsey LLP

(57) ABSTRACT

The electrolyte includes a cyclic polysiloxane having one or more side chains that each includes a poly(alkylene oxide) moiety and a spacer. Each spacer is positioned between the poly(alkylene oxide) moiety and a silicon on the main chain of the polysiloxane.

32 Claims, 2 Drawing Sheets

R = (CH$_2$)$_3$O(CH$_2$CH$_2$O)$_3$CH$_3$

U.S. PATENT DOCUMENTS

| | | | |
|---|---|---|---|
| 5,690,702 A | 11/1997 | Skotheim et al. | |
| 5,700,300 A | 12/1997 | Jensen et al. | |
| 5,731,104 A | 3/1998 | Ventura et al. | |
| 5,753,389 A | 5/1998 | Gan et al. | |
| 5,772,934 A | 6/1998 | MacFadden | |
| 5,882,812 A | 3/1999 | Visco et al. | |
| 5,885,733 A | 3/1999 | Ohsawa et al. | |
| 5,919,587 A | 7/1999 | Mukherjee et al. | |
| 5,961,672 A | 10/1999 | Skotheim et al. | |
| 6,013,393 A | 1/2000 | Taniuchi et al. | |
| 6,015,638 A | 1/2000 | Ventura et al. | |
| 6,124,062 A | 9/2000 | Horie et al. | |
| 6,168,885 B1 | 1/2001 | Narang et al. | |
| 6,181,545 B1 | 1/2001 | Amatucci et al. | |
| 6,248,481 B1 | 6/2001 | Visco et al. | |
| 6,252,762 B1 | 6/2001 | Amatucci | |
| 6,268,088 B1 | 7/2001 | Oh et al. | |
| 6,337,383 B1 | 1/2002 | West et al. | |
| 6,413,676 B1 | 7/2002 | Munshi | |
| 6,447,952 B1 | 9/2002 | Spiegel et al. | |
| 6,482,912 B2 | 11/2002 | Boudjouk et al. | |
| 6,495,287 B1 | 12/2002 | Kolb et al. | |
| 6,534,216 B1 * | 3/2003 | Narukawa et al. | 429/224 |
| 6,573,009 B1 | 6/2003 | Noda et al. | |
| 6,610,109 B2 | 8/2003 | Noh | |
| 6,653,015 B2 | 11/2003 | Yoshida et al. | |
| 6,783,897 B2 | 8/2004 | Kang et al. | |
| 6,858,351 B2 * | 2/2005 | Miura et al. | 429/317 |
| 2001/0001053 A1 * | 5/2001 | Hanson et al. | 429/233 |
| 2002/0028388 A1 | 3/2002 | Lee | |
| 2002/0051911 A1 | 5/2002 | Okada | |
| 2002/0192554 A1 | 12/2002 | Woo et al. | |
| 2003/0036003 A1 | 2/2003 | Shchori et al. | |
| 2003/0099884 A1 | 5/2003 | Chiang et al. | |
| 2003/0104282 A1 | 6/2003 | Xing et al. | |
| 2003/0180624 A1 | 9/2003 | Oh et al. | |
| 2003/0180625 A1 | 9/2003 | Oh et al. | |
| 2003/0198869 A1 | 10/2003 | West et al. | |
| 2004/0096746 A1 * | 5/2004 | Wietelmann et al. | 429/324 |
| 2006/0106187 A1 * | 5/2006 | Kennedy | 528/33 |

FOREIGN PATENT DOCUMENTS

| | | |
|---|---|---|
| EP | 0 525 728 A1 | 2/1993 |
| EP | 0 581 296 A2 | 2/1994 |
| EP | 0 581 296 A3 | 2/1994 |
| EP | 0 922 049 B1 | 2/1998 |
| EP | 0 932 215 A1 | 1/1999 |
| EP | 0 796 511 B1 | 8/1999 |
| EP | 1 024 502 A1 | 8/2000 |
| EP | 0 932 215 B1 | 5/2001 |
| EP | 1 202 374 A1 | 5/2002 |
| JP | 57-034661 | 2/1982 |
| JP | 57-034662 | 2/1982 |
| JP | 57-080670 | 5/1982 |
| JP | 57-111957 | 7/1982 |
| JP | 57-176669 A2 | 10/1982 |
| JP | 59-224072 A2 | 12/1984 |
| JP | 60-195877 | 10/1985 |
| JP | 60-216461 | 10/1985 |
| JP | 61-288374 | 12/1986 |
| JP | 62-209169 A2 | 9/1987 |
| JP | 63-010466 | 1/1988 |
| JP | 63-310569 | 12/1988 |
| JP | 02-080462 | 3/1990 |
| JP | 02-262274 | 10/1990 |
| JP | 02-291603 | 12/1990 |
| JP | 03-139566 | 6/1991 |
| JP | 05-036441 | 2/1993 |
| JP | 05-290616 | 11/1993 |
| JP | 07-320782 | 12/1995 |
| JP | 08-078053 A2 | 3/1996 |
| JP | 09-306544 | 11/1997 |
| JP | 11-214032 A2 | 1/1998 |
| JP | 10-172615 A2 | 6/1998 |
| JP | 11-185804 | 7/1999 |
| JP | 11-238523 | 8/1999 |
| JP | 11-302383 | 11/1999 |
| JP | 11-302384 A2 | 11/1999 |
| JP | 11-306856 A2 | 11/1999 |
| JP | 11-306857 A2 | 11/1999 |
| JP | 2000-058123 | 2/2000 |
| JP | 2000-154254 A2 | 6/2000 |
| JP | 2000-222939 A2 | 8/2000 |
| JP | 2000-277152 A2 | 10/2000 |
| JP | 2001-068115 | 3/2001 |
| JP | 2001-110455 A2 | 4/2001 |
| JP | 2001-185165 A2 | 7/2001 |
| JP | 2001-283907 A2 | 10/2001 |
| JP | 2001-283913 | 10/2001 |
| JP | 2002-063936 A2 | 2/2002 |
| JP | 2002-151150 A2 | 5/2002 |
| JP | 2002-155142 A2 | 5/2002 |
| JP | 2002-298913 A2 | 10/2002 |
| JP | 2002-343440 A2 | 11/2002 |
| JP | 2003-002974 A2 | 1/2003 |
| WO | WO 96/21953 | 7/1996 |
| WO | WO 98/07729 A1 | 2/1998 |
| WO | WO 00/00495 A1 | 1/2000 |
| WO | WO 00/08654 | 2/2000 |
| WO | WO 00/25323 A1 | 5/2000 |
| WO | WO 01/73884 A1 | 10/2001 |
| WO | WO 01/96446 A1 | 12/2001 |
| WO | WO 01/99209 A2 | 12/2001 |
| WO | WO 02/28500 A1 * | 4/2002 |
| WO | WO 03/083970 A1 | 10/2003 |
| WO | WO 03/083971 A1 | 10/2003 |
| WO | WO 03/083972 A1 | 10/2003 |
| WO | WO 03/083973 A1 | 10/2003 |
| WO | WO 03/083974 A1 | 10/2003 |
| WO | WO 03/090299 A1 | 10/2003 |

OTHER PUBLICATIONS

Y. Kang et al., Solid Polymer Electrolytes Based on Cross-Linked Polysiloxane-g-oligo(ethylene oxide): Ionic Conductivity and Electrochemical Properties, Journal of Power Sources 119-121 (Jun. 1, 2003), pp. 448-453.

M. Ouchi et al., Convenient and Efficient Tosylation of Oligoethylene Glycois and the Related Alcohols in Tetrahydrofuran-Water in the Presence of Sodium Hydroxide, The Chemical Society of Japan, Apr. 1990, 1260-1262, 63, 4.

H. Allcock et al., Polyphosphazenes Bearing Branched and Linear Oligoethyleneoxy Side Groups as Solid Solvents for Ionic Conduction, Macromolecules, Nov. 23, 1996, 7544-7552, 29.

F. Gray, Polymer Electrolytes, RSC Materials Monographs, UK, Jan. 1, 1997, 46-49.

J. Blackwell et al., $B(C_6F_5)_3$-Catalyzed Silation of Alcohols: A Mild General Method for Synthesis for Silyl Ethers, Journal of Organic Chemistry, Jun. 9, 1999, 4887-4892, 64.

W. Xu et al., LiBOB and its Derivatives Weakly Coordinating Anions, and the Exceptional Conductivity of Their Nonaqueous Solutions, Electrochemical and Solid-State Letters, 2001, E1-E4, 4(1).

W. Xu et al., Ionic Conductivity and Electrochemical Properties of Lithium Orthoborate Salts, http://www.electrochem.org/meetings/past/200/abstracts/symposia/bla/0107.pdf, United States, Sep. 5, 2001.

T. Fujii et al., Application of LiBOB as an Electrolyte Salt for 4 V Class Lithium Ion Rechargeable Cells, http://www2.electrochem.org/cgi-bin/abs?mtg=202&abs=0203, Oct. 24, 2002, United States.

W. Xu et al., Structures of Orthoborate Anions and Physical Properties of Their Lithium Salt Nonaqueous Solutions, Journal of the Electrochemical Society, 2003, 1-0, 150(1).

Z. Zhang et al., Cross-Linked Network Polymer Electrolytes based on a Polysiloxane Backbone with Oligo(oxyethylene) Side Chains: Synthesis and Conductivity, Macromolecules, Oct. 28, 2003, vol. 36, No. 24, 9176-9180.

M. Armand, New Electrode Material, Proceedings of the NATO Sponsored Advanced Study Institute on Fast Ion Transport in Solids, Solid State Batteries and Devices, 1972, Belgirate, Italy.

D. Fenton et al., Complexes of Alkali Matel Ions with Poly(Ethylene Oxide), Polymer, Nov. 1973, 589, 14.

E. Tsuchida et al., Conduction of Lithium Ions in Polyvinylidene Fluoride and its Derivates-I, Electrochimica Acta, 1983, 591-595, 28(5).

L. Hardy et al., Chloride Ion Conductivity in a Plasticized Quaternary Ammonium Polymer, Macromolecules, 1984, 975-977, 17.

D. Bannister et al., A Water-Soluble Siloxane: Poly(ethylene glycol) Comb Polymer, Journal of Polymer Science: Polymer Letters Edition, 1985, 465-467, 23.

I. Kelly et al., Poly(Ethylene Oxide) Electrolytes for Operation at Near Room Temperature, Journal of Power Sources, 1985, 13-21, 14.

D. Fish et al., Conductivity of Solid Complexes of Lithium Perchlorate with Poly{[w-methoxyhexa(oxyethylene)ethoxy]methylsiloxane}$^{a)}$, Makromol. Chem., Rapid Commun., 1986, 115-120, 7.

P. Hall et al., Ion Conductivity in Polysiloxane Comb Polymers With Ethylene Glycol Teeth, Polymer Communications, 1986, 3 pages, 27.

D. Fish et al., Polymer Electrolyte Complexes of $ClO_4$ and Comb Polymers of Siloxane with Oligo-oxyethylene Side Chains, British Polymer Journal, 1988, 281-288, 20, 3.

S. Ganapathiappan et al., A New Class of Cation Conductors: Polyphosphazene Sulfonates, Macromolecules, 1988, 2299-2301, 21.

I. Khan et al., Comblike Polysiloxanes with Oligo(oxyethylene) Side Chains, Synthesis and Properties, Macromolecules; 1988, 2684-2689, 21.

R. Spindler et al., Investigations of a Siloxane-Based Polymer Electrolyte Employing $^{13}C$, $^{29}Si$, $^{7}Li$, and $^{23}Na$ Solid State NMR Spectroscopy, Journal of American Chemical Society, 1988, 3036-3043, 110.

R. Spindler et al., Synthesis NMR Characterization, and Electrical Properties of Siloxane-Based Polymer Electrolytes, Macromolecules, 1988, 648-654, 21.

S. Ganapathiappan et al., Synthesis Characterization and Electrical Response of Phosphazene Polyelectrolytes, Journal of America Chemical Society, 1989, 4091-4095, 111.

L. Dominey et al., Thermally Stable Lithium Salts for Polymer Electrolytes, Electrochimica Acta, 1992, 1551-1554, 37(9).

F. Alloin et al., Triblock Copolymers and Networks Incorporating Oligo (Oxyethylene) Chains, Solid State Ionics 1993, 3-9, 60.

C. ST. Pierre et al., Lithium-Metal-Polymer Battery for Electric Vehicle and Hybrid Electric Vehicle Applications, www.avestor.com/en/automotive.html, info@avestor.com, 1993, 11 pages.

G. Zhou et al., Solvent-Free Cation-Conduction Polysiloxane Electrolytes with Pendant Oligo(oxyethylene) and Sulfonate Groups, Macromolecules, 1993, 2202-2208, 26.

M. Gauthier et al., Large Lithium Polymer Battery Development The Immobile Solvent Concept, Journal of Power Sources, 1995, 163-169, 54.

K. Abraham et al., Highly Conductive PEO-Like Polymer Electrolytes, Journal of Chemical Materials, 1997, 1978-1988, 9(9).

M. Furlani et al., Time Resolved Luminescence and Vibrational Spectroscopic Studies on Complexes of Poly(Ethylene.Oxide) Oligomers and Eu(TFSI)$_3$, Salt, 11th International Conference on Solid State Ionics, 1997, 10 pages.

J. Gnanaraj et al., Studies on Comb-like Polymer Blend with Poly(Ethylene Oxide)—Lithium Perchlorate Salt Complex Electrolyte, Polymer, 1997, 3709-3712 38(14).

F. Gray, Polymer Electrolytes RSC Materials Monographs, UK, 1997, 46-49.

S. Kohama et al., Alcoholysis of Poly(methylhydrogensiloxane), Journal of Applied Sciences, 1997, 21, 863-867

C. Letourneau et al., Progress in Lithium-Metal-Polymer Battery System for Electric Vehicles, http://www.avestor.com/iactivefiles/evs15.pdf, info@avestor.com, INTELEC, Oct. 1998, Canada, 1-10.

R. Hooper et al., A Highly Conductive Solid-State Polymer Electrolyte Based on a Double-Comb Polysiloxane Polymer with Oligo(Ethylene Oxide) Side Chains, Organometallics, American Chemical Society, 1999, 3249-3251, 18(17).

Z. Wang et al., Thermal Electrochemical, and Spectroscopic Characterizations of Hyperbranched Polymer Electrolyte, Journal of Electrochemical Society, 1999, 2209-2215, 146(6).

M. Anderman et al., Advanced Batteries for Electric Vehicles: An Assessment of Performance, Cost, and Availability, Prepared for State of California Air Resources Board by The Year 2000 Battery Technology Advisory Panel, 2000, i-ix and 60-65.

A. Reiche et al., Gel Electrolytes on the Basis of Oligo(Ethylene Glycol)$_n$ Dimethacrylates—Thermal, Mechanical and Electrochemical Properties in Relationship to the Network Structure, Polymer, 2000, 3821-3836, 41.

R. Hooper et al., Highly Conductive Siloxane Polymers, Macromolecules, 2001, 931-936, 34.

X. Hou et al., Novel Interpenetrating Polymer Network Electrolytes, Polymer, 2001, 4181-4188, 42.

C.F. Rome, The Unique Properties of Silicone at the Service of the Petroleum Industry, Hydrocarbon Asia, 2001, 42-49, www.hcasia.safan.com/mag/may-jun01/Tech-Silicone.pdf.

N. Katayama et al., Thermal Stability of Propylene Carbonate and Ethylene Carbonate-Propylene Carbonate-Based Electrolytes for Use in Li Cells, Journal of Power Sources, 2002, 1-6, 4769, http://www.sciencedirect.com/web-editions.

K. Xu et al., LiBOB as Salt for Lithium-Ion Batteries, Electrochemical and Solid State Letters, 2002, pp. A26-A29, vol. 5(1).

J. Alper, The Battery: Not Yet a Terminal Case, Science, May 2002, 1224-1226, vol. 296, www.sciencemag.org.

B. Oh et al., New Interpenetrating Electrolyte Network-Type Siloxane Polymer Electrolyte Electrochemical and Solid State Letters, 2002, E59-E61, 5(11), The Electrochemical Society, Inc., Sep. 11, 2002.

International Search Report, dated May 1, 2003, received in relation to Application No. PCT/US03/02127.

International Search Report, dated Jul. 11, 2003, received in relation to Application No. PCT/US03/08740.

International Search Report, dated Sep. 12, 2003, received in relation to Application No. PCT/US03/08784.

International Search Report, dated Oct. 9, 2003, received in relation to Application No. PCT/US03/08783.

NICODOM Ltd., Inorganic Library of FT-IR Spectra Inorganics II—Boron Compounds, homepage, website http://www.ftir.cz/INLIB2.html and http://www.ftir.cz/home_page_of_nicodom_sro.htm.

* cited by examiner

ELECTROLYTE FOR ELECTROCHEMICAL CELL

REFERENCE TO PRIOR FILED APPLICATIONS

This application is a continuation-in-part of U.S. patent application Ser. No. 10/663,023, filed Sep. 15, 2003; now abandoned entitled "Electrolyte System" and incorporated herein in its entirety.

This application is related to PCT application number PCT/US03/08779, entitled "Polymer Electrolyte for Electrochemical Cell" and filed Mar. 20, 2003 which claims priority to U.S. Provisional Patent Application Ser. No. 60/446,848, entitled "Polymer Electrolyte for Electrochemical Cell" and filed Feb. 11, 2003. This application is also related to copending provisional application Ser. No. 60/443,892 entitled "Nonaqueous Liquid Electolyte" filed Jan. 30, 2003; and to PCT/US03/02127, filed Jan. 22, 2003; and to PCT/US03/02128, filed Jan. 22, 2003; and to copending U.S. application Ser. No. 10/167,940 filed Jun. 12, 2002, which is a Continuation-in-Part of co-pending application Ser. No. 10/104,352, filed Mar. 22, 2002. Each of the patent applications mentioned in this paragraph is incorporated herein in its entirety by reference, including all disclosures submitted therewith.

GOVERNMENT LICENSE RIGHTS

This invention was made with United States Government support under NIST ATP Award No. 70NANB043022 awarded by the National Institute of Standards and Technology (NIST). The United States Government has certain rights in this invention pursuant to NIST ATP Award No. 70NANB043022 and pursuant to Contract No. W-31-109-ENG-38 between the United States Government and the University of Chicago representing Argonne National Laboratory, and NIST 144 LM01, Subcontract No. AGT DTD Sep. 9, 2002.

FIELD

The present invention relates to electrolytes for use in electrochemical devices, and, more particularly to electrolytes including cyclic polysiloxanes.

BACKGROUND

The demand for lithium secondary batteries to meet high power and high-energy system applications has resulted in substantial research and development activities to improve their safety, as well as performance. As the world becomes increasingly dependent on portable electronic devices, and looks toward increased use of electrochemical storage devices for vehicles, power distribution load leveling and the like, it is increasingly important that the safety of such devices be paramount, especially as these devices are being used in such environments as airliners and space vehicles. Similarly, safety for medical applications must be paramount. The effort to date has included research in flame-retardants, solid electrolytes, and new electrolyte concepts with improved thermostability. Thus, the development of highly conductive electrolytes, free of problems associated with volatile and combustible solvents, is of paramount importance.

SUMMARY

Disclosed is an electrolyte including a cyclic polysiloxane having one or more side-chains that each include a poly (alkylene oxide) moiety and a spacer. Each spacer is positioned between the poly(alkylene oxide) moiety and a silicon on the main chain of the polysiloxane.

In one aspect of the invention, the electrolyte is a liquid and the cyclic polysiloxane has a structure represented by the formula:

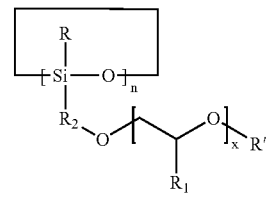

wherein R is an alkyl or aryl group; R' is an alkyl or aryl group; $R_1$ is hydrogen or an alkyl group; $R_2$ is a spacer made up of one or more $CH_2$ groups; n is up to 100; and x is from 1 to 30.

In another aspect of the invention, the electrolyte is a solid and the cyclic polysiloxane has a structure represented by the formula:

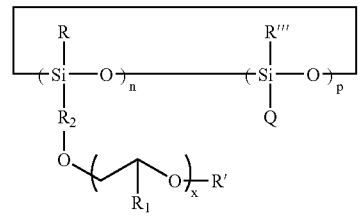

wherein R is an alkyl group, R' is an alkyl or aryl group, R''' is alkyl or hydrogen; $R_1$ is hydrogen or an alkyl group; $R_2$ is a spacer made up of one or more $CH_2$ groups; p is greater than 0; n is from 1 to 100; x is from 1 to 30; and Q is a cross-linker linking the polysiloxane to another polysiloxane. Examples of the cross-linker represented by the Q include, but are not limited to, $-CH_2-CH_2-CH_2-R_3-CH_2-CH_2-CH_2-$, where $R_3$ is a moiety selected from the group consisting of $O-(CH_2CH_2O)_q$ and $Si-O-(Si-O)_k-Si$, where q is at least 4 and less than 30, and k is at least 5 and less than 30.

The cyclic polysiloxane can be synthesized so as to have an average molecular weight less than or equal to 3,000 g/mol. In some instances, the polysiloxane is synthesized so as to have a dynamic viscosity less than or equal to 2,000 cps or 10,000 cps.

The electrolyte can include a salt such as a lithium salt. Suitable lithium salts include, but are not limited to, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, lithium bis(chelato)borates such as lithium bis(oxalato)borate ($LiB(C_2O_4)_2$), $LiPF_3(C_2F_5)_3$, and $LiPF_3(CF_3)_3$. In some instances, the electrolyte includes a lithium bis(chelato) borate having 5 to 10 membered rings or 5 to 7 membered rings.

The electrolyte can include one or more network polymers. In some instances, the cyclic polysiloxane is entrapped within the network polymer. Although an electrolyte can be a liquid or a gel, the network forming polymer can serve to solidify the electrolyte. In some instances, the network polymer is a cross-linked polyacrylate, a cross-linked polymethacrylate, or a cross-linked polysiloxane.

In some instances, a precursor for forming the network polymer is represented by general formula:

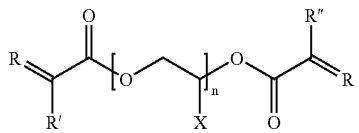

wherein R is an alkyl group having 1 to 10 carbon atoms; each of R' and R" is selected from the group consisting of: hydrogen, an alkyl group having 1 to 10 carbon atoms, and an alkenyl group having 2 to 12 carbon atoms; X is hydrogen or an alkyl group; and n is 1 to 15.

The electrolyte can also include at least one solid polymer. In some instances, the solid polymer can serve to solidify the electrolyte. The at least one solid polymer can be selected from the group consisting of: polyacrylonitrile (PAN), poly(methyl methacrylate) (PMMA), poly(vinylidene fluoride) (PVdF), poly(vinylidene fluoride-co-hexafluoropropylene), poly(vinyl acetate), polystyrene, and poly(ethylene oxide) (PEO).

Also disclosed is a method for synthesizing a cyclic polysiloxane. The method includes mixing a cyclic polysiloxane precursor having at least a portion of the main chain silicons bonded to a hydrogen and an allyl terminated side-chain precursor that includes a poly(alkylene oxide) moiety. The polysiloxane and side-chain precursor are mixed so as to form a cyclic polysiloxane having one or more side-chains that each include a poly(alkylene oxide) moiety and a spacer positioned between the poly(alkylene oxide) moiety and a silicon on the main chain of the cyclic polysiloxane. In some instances, the side-chain precursor includes tri(ethyleneglycol) methyl ether.

The method can also include mixing a catalyst with the polysiloxane and the side-chain precursor. The catalyst can include platinum. In some instances, the catalyst includes dicyclopentadiene platinum(II) dichloride.

DETAILED DESCRIPTION

Figure 1:
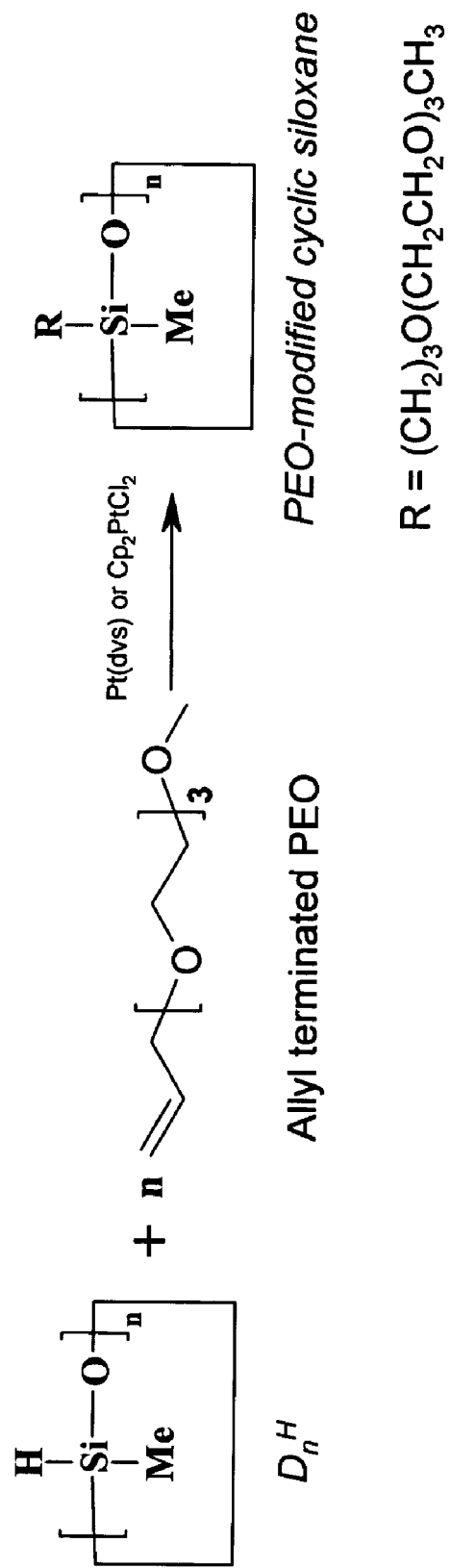
FIG. 1 is a summary of the synthesis of one species of the cyclic polysiloxane of present invention.

The invention relates to an electrolyte that includes a cyclic polysiloxane having one or more spacers that are each positioned between a main chain silicon and a poly(alkylene oxide) moiety. These polysiloxanes can be reasonably easy to synthesize and can provide an electrolyte with a high ionic conductivity near room temperature. Further, the polysiloxanes can coordinate with lithium salts and can often dissociate these salts. These polysiloxanes can be used in liquid electrolytes or in solid electrolytes. When these polysiloxanes are used in a liquid electrolyte, the choice of a cyclic structure can reduce the molecular weight and therefore lead to a decrease in viscosity and increase in Li-ion conductivity.

These polysiloxanes can be entrapped inside cross-linked polymer networks or mixed with solid polymers such as polyacrylonitrile (PAN), poly(methyl methacrylate) (PMMA), poly(vinylidene fluoride) (PVdF), poly(vinylidene fluoride-co-hexafluoropropylene), poly(vinyl acetate), polystyrene, poly(ethylene oxide) (PEO), etc. These polysiloxanes can also be employed in a cross-linked electrolyte solution.

These polysiloxanes can also yield an electrolyte that is suitable for high-energy and long-life lithium primary and/or secondary batteries including, but not limited to, biomedical devices, electric and hybrid vehicles, consumer electronics, submarines, and satellites. Further, the electrolytes of the present invention can be used in an electrochemical cell, providing enhanced shelf life and safety.

The electrolyte includes a cyclic polysiloxane having one or more side-chains that each include a poly(alkylene oxide) moiety and a spacer. Each spacer is positioned between the poly(alkylene oxide) moiety and a silicon on the main chain of the polysiloxane. The spacer can includes one or more carbons. Further, the spacer can includes one or more $CH_2$ groups.

The electrolyte can be a liquid. General Formula I represents examples of polysiloxane structures that are suitable for use in a liquid electrolyte. Formula I shows poly(ethylene oxide) serving as the poly(alkylene oxide) and a carbon based spacer. The cyclic polysiloxane main body can provide flame-retardant properties and chemical stability. The poly(ethylene oxide) moiety in the side chains can provide ionic conduction. Suitable methods for synthesizing these polysiloxanes include, but are not limited to, dehydrogenation using mild catalysts such as aryl borate or potassium carbonate, or hydrosilylation using platinum complex catalysts such as Pt(dvs) or (dicyclopentadiene) $PtCl_2$.

General Formula I:

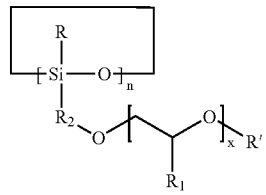

wherein R is an allyl or aryl group; R' is an alkyl or aryl group; $R_1$ is hydrogen or an alkyl group; $R_2$ is a spacer made up of one or more $CH_2$ groups; n is up to 100; and x is from 1 to 30.

A liquid electrolyte can be formed by dissolving a salt in a liquid polysiloxane having a structure according to General Formula I. The cyclic polysiloxane dissolves a variety of salts including, but not limited to, lithium salts and other salts that exclude lithium. Examples of lithium salts suitable for dissolving in the cyclic polysiloxane include, but are not limited to, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, lithium bis(oxalato)borate ($LiB(C_2O_4)_2$), as well as other lithium bis(chelato)borates having five to seven membered rings, $LiPF_3(C_2F_5)_3$, $LiPF_3(CF_3)_3$, and mixtures thereof. The polysiloxane can have enough flexibility to transport the lithium ions that result from dissolving the salt. As a result, the polysiloxane is suitable for use in the electrolytes of electrochemical devices such as batteries and capacitors.

The electrolyte is preferably synthesized with an [EO]/[Li] ratio of 5 to 50. In determining the [EO]/[Li] ratio, [EO] is the molar concentration in the electrolyte of the active oxygens in the one or more siloxane polymers. Because [EO] is directed to active oxygens, there are x+1 oxygens in each side chain constructed according to Formula I. [Li] is the molar concentration of the lithium in the electrolyte. If the [EO]/[Li] ratio is larger than 50, the ionic conductivity of the resulting polymeric electrolyte can decrease undesirably because of the inadequate numbers of carrier ions in the electrolyte. If the [EO]/[Li] ratio is smaller than 5, the salt may not sufficiently dissociate and the aggregated lithium ions can reduce the ionic conductivity. A suitable average molecular weight for cyclic polysiloxanes having a structure according to General Formula I includes, but is not limited to, an average molecular weight less than or equal to 3,000 g/mole.

The electrolyte can include one or more other polysiloxanes blended with the cyclic polysiloxane. Different polysiloxanes in the blend can be selected to provide different functions. For instance, a polysiloxane according to General Formula I may provide the electrolyte with a high degree of voltage stability while other polysiloxanes in the blend may provide the electrolyte with a high degree of ionic conductivity. Examples of polysiloxanes that are particularly suitable for combining with a cyclic polysiloxane according to General Formula I are taught in PCT application number PCT/US03/08779, entitled "Polymer Electrolyte for Electrochemical Cell" and filed Mar. 20, 2003 which claims priority to U.S. Provisional Patent Application Ser. No. 60/446,848, entitled "Polymer Electrolyte for Electrochemical Cell" and filed Feb. 11, 2003 each of which are incorporated by reference herein in its entirety.

The cyclic polysiloxane can also be employed in a solid or gel electrolyte. For instance, the cyclic polysiloxane can be cross-linked so as to form a solid or a gel. Examples of polysiloxane structures that are suitable for use in a solid and/or gel electrolyte are represented by General Formula II:

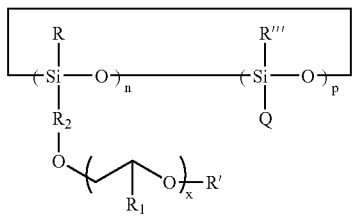

wherein R is an alkyl group, R' is an alkyl or aryl group, R''' is alkyl or hydrogen; $R_1$ is hydrogen or an alkyl group; $R_2$ is a spacer made up of one or more $CH_2$ groups; p is greater than 0; n is from 1 to 100; x is from 1 to 30; and Q is a cross-linker that links the main chain of one polysiloxane to the main chain of another polysiloxane.

A polysiloxane having a structure according to General Formula II can be synthesized by employing a hydrosilylation reaction between Si—H bonds on a precursor polysiloxane and an allyl terminated cross-linking agent. Examples of polysiloxane structures that are suitable for use as a precursor polysiloxane in the hydrosilylation reaction are represented by General formula III:

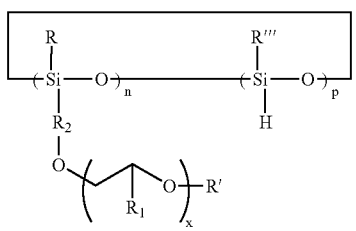

wherein R is an alkyl group; R' is an alkyl or aryl group; R''' is alkyl or hydrogen; $R_1$ is a hydrogen or an alkyl group; $R_2$ is a spacer made up of one or more $CH_2$ groups; p is greater than 0; n is from 1 to 100; and x is from 1 to 30. The hydrogen bonded silicons can serve as cross-linker binding sites during the hydrosilylation reaction. Suitable ratios of p:n include, but are not limited to, ratios in a range of 1:6 to 1:1. The hydrogen-bonded silicons need not be positioned adjacent to one another along the main chain but can be distributed among the silicons bonded to side chains.

Suitable cross-linking agents for use in the hydrosilylation reaction include, but are not limited to, compounds terminated with two or more allyl groups. Examples of suitable cross-linking agents include diallyl-terminated siloxane, diallyl terminated polysiloxanes, diallyl terminated alkylene glycols, and diallyl terminated poly(alkylene glycol)s. Examples of suitable cross-linking agents can be represented by the formula, $CH_2=CH-CH_2-R_3-CH_2-CH=CH_2$, where $R_3$ is a moiety selected from the group consisting of $O-(CH_2CH_2O)_q$ and $Si-O-(Si-O)_k-Si$, where q is at least 4 and less than 30, and k is at least 4 and less than 30. These cross-linking agents can be generated as disclosed in U.S. patent application Ser. No. 10/367,013, filed Feb. 13, 2003, entitled "Cross-linked Polysiloxanes" and incorporated herein in its entirety. When these cross-linking agents are employed to cross-link a polysiloxane having a portion of the main chain silicons bonded to a hydrogen, the Si—H bonds in the main chain of the polysiloxane are replaced with a bond between the silicon and a terminal carbon on the cross-linking agent. Accordingly, examples of the cross-linker represented by the Q in Formula II can be represented by the formula, $-CH_2-CH_2-CH_2-R_3-CH_2-CH_2-CH_2-$, where $R_3$ is a moiety selected from the group consisting of $O-(CH_2CH_2O)_q$ and $Si-O-(Si-O)_k-Si$, where q is at least 4 and less than 30, and k is at least 5 and less than 30.

A solid electrolyte having a cross-linked polysiloxane can be formed by mixing the polysiloxane precursor and the cross-linking agent in a precursor solution. In some instances, a solvent may also be added to the precursor solution. Suitable solvents include, but are not limited to, tetrahydrofuran (THF). One or more of the salts discussed above can be added to the precursor solution. The one or more salts can be added directly or can be included in the solvent or other component of the precursor solution. In some instances, a catalyst is added to the precursor solution to react the polysiloxane precursor with the cross-linking agent. Suitable catalysts include, but are not limited to, platinum catalysts such as Karstedt's catalyst, dicyclopentadiene platinum(II) dichloride and $H_2PtCl_6$. Karstedt's catalyst has a structure represented by the following formula:

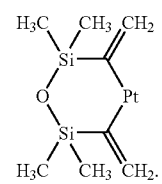

These catalysts are mentioned by way of example and are not intended to limit the scope of potential catalysts. In some instances, a cross-linking inhibitor is added to the precursor solution to slow the reaction enough to permit handling prior to the viscosity changing. Suitable inhibitors include, but are not limited to, dibutyl maleate. In some instances, vacuum can be applied to the precursor solution to remove solvent and/or trace moisture. The vacuum may be applied during and/or after formation of the precursor solution. Additionally, heat is applied to the precursor solution to react the polysiloxane precursor with the cross-linking agent and to convert the precursor solution to a solid or to a gel electrolyte.

Another embodiment of a solid electrolyte includes a network polymer in addition to the cyclic polysiloxane. In some instances, a cyclic polysiloxane having a structure according to General Formula I and/or General Formula II is entrapped within the network polymer. An electrolyte including a networking polymer can often be converted from a liquid to a solid or a gel. Accordingly, an electrolyte including a network polymer can be a solid, a gel, or a liquid.

A polysiloxane can serve as the network polymer. In some instances, a network polysiloxane can enhance ionic conductivity and/or stability. Suitable network polysiloxanes can be formed from a precursor polysiloxane having n of the main chain silicons bonded to a hydrogen and m of the main chain silicons bonded to a side chain. The side chains can include a poly(alkylene) moiety or an oligo(alkylene) moiety. Suitable poly(alkylene)s include, but are not limited to, poly(ethylene). Suitable oligo(alkylene)s include, but are not limited to, oligo(ethylene)s. Suitable ratios for the number of n silicons to the number of m silicons include, but are not limited to, ratios in a range of 1:4 to 1:200, in a range of 1:6 to 1:100, or in a range of 1:6 to 1:70. The hydrogen-bonded silicons need not be positioned adjacent to one another along the main chain but can be distributed among the silicons bonded to side chains.

A suitable precursor polysiloxane for use in forming a network polymer can be linear or cyclical. An example of a cyclical precursor polysiloxane is represented by General Formula IV and example of a linear precursor polysiloxane is represented by General Formula V.

General Formula IV:

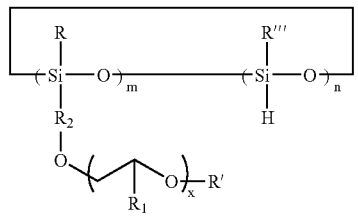

wherein R is an alkyl group; R' is an alkyl or aryl group; R''' is an alkyl group or a hydrogen; $R_1$ is hydrogen or an alkyl group; $R_2$ is a spacer made up of one or more $CH_2$ groups; n is greater than 0; m is from 1 to 100; and x is from 1 to 30.

General Formula V:

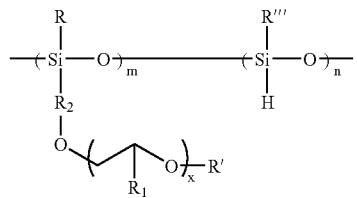

wherein R is an alkyl group; R' is an alkyl or aryl group; R''' is an alkyl group or a hydrogen; $R_1$ is a hydrogen or an alkyl group; $R_2$ is a spacer made of one or more $CH_2$ groups; m is from 1 to 100; n is greater than 0; and x is from 1 to 30.

A precursor polysiloxane having a portion of the main chain silicons bonded to a hydrogen can be reacted with a cross-linking agent to generate a cross-linked polysiloxane suitable for serving as a network polymer. Suitable cross-linking agents include, but are not limited to, compounds terminated with two or more allyl groups. Examples of suitable cross-linking agents include diallyl-terminated siloxane, diallyl terminated polysiloxanes, diallyl terminated alkylene glycols, and diallyl terminated poly(alkylene glycol)$_s$. Suitable cross-linking agents can be represented by the formula, $CH_2$=CH—$CH_2$—$R_3$—$CH_2$—CH=$CH_2$, where $R_3$ is a moiety selected from the group consisting of O—$(CH_2CH_2O)_q$ and Si—O—(Si—O)$_k$—Si, where q is at least 4 and less than 30, and k is at least 5 and less than 30. These cross-linking agents can be generated as disclosed in U.S. patent application Ser. No. 10/367,013, filed Feb. 13, 2003, entitled "Cross-linked Polysiloxanes" and incorporated herein in its entirety. When these cross-linking agents are employed to cross-link a precursor polysiloxane, the Si—H bonds in the main chain of the polysiloxane are replaced with a bond between the silicon and a terminal carbon on the cross-linking agent. Accordingly, the cross-linker that results from these cross-linking agents can be represented by the formula, —$CH_2$—$CH_2$—$CH_2$—$R_3$—$CH_2$—$CH_2$—$CH_2$—, where $R_3$ is a moiety selected from the group consisting of O—$(CH_2CH_2O)_q$ and Si—O—(Si—O)$_k$—Si, where q is at least 4 and less than 30, and k is at least 5 and less than 30.

When the electrolyte is to include one or one more network polysiloxanes in addition to the cyclic polysiloxane, the one or more network polysiloxanes can be cross-linked before the cyclic polysiloxane is blended with the network polysiloxane. Alternatively, the network polysiloxane can be cross-linked in the presence of the cyclic polysiloxane. Additionally, the one or more network polysiloxanes can be cross-linked and one or more cyclic polysiloxanes can be polymerized in the presence of one another.

An example of a method for forming a solid electrolyte having a cyclic polysiloxane entrapped within a network polymer includes mixing a cyclic polysiloxane, the polysiloxane precursor and the cross-linking agent in a precursor solution. In some instances, a solvent may also be added to the precursor solution. Suitable solvents include, but are not limited to, THF. One or more of the salts discussed above can be added to the precursor solution. The one or more salts can be added directly to the precursor solution or can be included in the solvent or in another component of the precursor solution. In some instances, a catalyst is added to the precursor solution to react the polysiloxane precursor with the cross-linking agent. Suitable catalysts include, but are not limited to, platinum catalysts. These catalysts are mentioned by way of example and are not intended to limit the scope of potential catalysts. In some instances, a cross-linking inhibitor is added to the precursor solution to slow the reaction enough to permit handling prior to the viscosity changing. Suitable inhibitors include, but are not limited to, dibutyl maleate. In some instances, vacuum applied to the precursor solution to remove solvent and/or trace moisture. Additionally, heat can applied to the precursor solution to react the polysiloxane precursor with the cross-linking agent. The reaction of the polysiloxane precursor with the cross-linking agent forms the network polymer and converts the precursor solution to a solid or to a gel electrolyte.

The network polymer need not be a polysiloxane. For instance, other examples of network polymers include, but are not limited to, cross-linked polyacrylates and cross-linked polymethacrylates. Suitable precursors for forming the network polymer include, but are not limited to, acrylates and methacrylates. Acrylates and/or methacrylates having two or more functionalities can both polymerize and cross-link to form a cross-linked polyacrylate network polymer and/or to form a cross-linked polymethacrylate network polymer. In some instances, acrylates and/or methacrylates having four or more functionalities are a preferred network monomer. Suitable acrylates include, but are not limited to, poly(alkylene glycol) diacrylate. Suitable methacrylates include, but are not limited to, poly(alkylene glycol) dialkylacrylates such as poly (ethylene glycol) dimethacrylate. Other suitable poly(alkylene glycol) dialkyl alkyl acrylates are represented by Formula VII.

Formula VII:

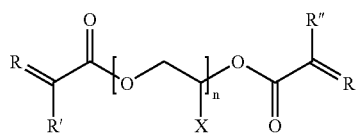

wherein R represents a group selected from an alkyl group having 1 to 10 carbon atoms; R' represents hydrogen or an alkyl group having 1 to 10 carbon atoms or an alkenyl group having 2 to 12 carbon atoms; R" represents hydrogen or an alkyl group having 1 to 10 carbon atoms or an alkenyl group having 2 to 12 carbon atoms; X represents hydrogen or an alkyl group, preferably a methyl group; and n is 1 to 15.

When a cross-linking network monomer is employed to form the network polymer, a control monomer can be employed to control cross-linking density. Formula VIII represents a suitable control monomer for use with a network monomer constructed according to Formula VII.

Formula VIII:

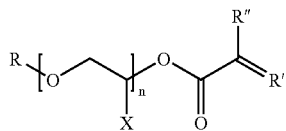

where R represents an alkyl group having 1 to 10 carbon atoms; R' represents an alkyl group having 1 to 10 carbon atoms; and R" represents hydrogen or a group selected from an alkyl group having 1 to 10 carbon atoms and/or an alkenyl group having 2 to 12 carbon atoms; X represents a hydrogen or a methyl group; and n represents a whole number from 1 to 20.

An example of a method for forming an electrolyte that includes a network polymer in addition to the cyclic polysiloxane includes mixing the cyclic polysiloxane, monomers for forming one or more network polymers, one or more radical initiators, and one or more salts so as to form a precursor solution. Suitable radical initiators include, but are not limited to, thermal initiators including azo compounds such as azoisobutyronitrile, peroxide compounds such as benzoyl peroxide, and bismaleimide. In some instances, a control monomer is also added to the precursor solution to control the cross-linking density of the network monomer.

Electrolytes that include a network polymer and/or that include a cross-linked cyclic polysiloxane can often be solidified by providing sufficient heat to allow the initiator and/or a catalyst to begin working. In some instances, the electrolyte is solidified by heating to a temperature greater than 75° C. Accordingly, these electrolytes can often be solids. When a solid electrolyte is desired, a film of a precursor solution can be formed on a substrate. Suitable substrates include, but are not limited to, porous media and/or a substrate of an electrode for use in an electrochemical device such as a battery. Suitable porous media can serve as a separator in an electrochemical cell and include, but are not limited to, polyolefin separators, nonwoven separator, and polycarbonate separator. In some instances, the film on the substrate and/or the porous media can be heated to initiate cross-linking and solidify the electrolyte.

In some instances, the network polymer forms an interpenetrating network with the cyclic polysiloxane. An electrolyte having an interpenetrating network can be formed by the interpenetrating network polymerization method taught in U.S. patent application Ser. No. 10/104,352, filed on Mar. 22, 2002, entitled "Solid Polymer Electrolyte and Method of Preparation" and incorporated herein in its entirety. An electrolyte having an interpenetrating network can be formed by polymerizing and/or cross-linking one or more network polymers in the presence of the cyclic polysiloxane. Alternately, an electrolyte having an interpenetrating network can be formed by polymerizing and/or cross-linking the cyclic polysiloxane in the presence of the network forming monomer or monomers. Alternately, electrolyte having an interpenetrating network can be formed by polymerizing and/or cross-linking the cyclic polysiloxane and the network forming monomer in the presence of one another.

In an interpenetrating network formed using the monomers represented by Formula VII, the network polymer is formed from a monomer that cross-links. A network polymer suitable for the interpenetrating network can be formed using other precursors. For instance, the network polymer can be formed from monomers and cross-linking agents that are different from one another. Further, the monomers can heteropolymerize.

Other examples of methods of forming an interpenetrating network and electrochemical cells including electrolytes with interpenetrating network are described in U.S. patent application Ser. No. 10/104,352, filed on Mar. 22, 2002, entitled "Solid Polymer Electrolyte and Method of Preparation" and incorporated herein in its entirety.

Further, the electrolyte can include a solid polymer that serves to solidify the electrolyte. The cyclic polysiloxane and the solid polymer can be formed before being mixed together. Alternatively, the cyclic polysiloxane can be formed in the presence of the solid polymer and/or the solid polymer can be formed in the presence of the cyclic polysiloxane. Examples of suitable solid polymers include, but are not limited to, polyacrylonitrile (PAN), poly(methyl methacrylate) (PMMA), poly(vinylidene fluoride) (PVdF), poly(vinylidene fluoride-co-hexafluoropropylene), poly(vinyl acetate), polystyrene, and poly(ethylene oxide) (PEO).

EXAMPLES

Example 1

A cyclic polysiloxane was synthesized according to FIG. 1 with n equal to 4. The cyclic polysiloxane was synthesized using a platinum complex catalyst as follows: To a 250-mL flame-dried flask was added 1,3,5,7-tetramethylcyclotetrasiloxane ($D_4^H$) (Gelest, 12.0 g, 0.20 mol Si—H group), allyl terminated tri(ethyleneglycol) methyl ether (48.96 g, 0.24 mol, 20% excess) under nitrogen atmosphere. The heterogeneous mixture was stirred vigorously, and 30 μl platinum divinyltetramethyldisiloxane (Pt(dvs)) (Aldrich, 3% solution in xylene) was injected into the mixture using a syringe and the temperature was gradually raised to 70-75° C. The reaction mixture was continuously stirred at this temperature for about 24 hours until no Si—H signal (4.7 ppm) was detected on $^1$H-NMR spectrum. After excess allyl terminated tri(ethyleneglycol) methyl ether and its isomer were removed by Kugelrohr distillation by heating to about 120° C. in a reduced atmospheric pressure of about 0.1 torr, the liquid was measured by FTIR which showed no Si—H and monomer peaks.

Figure 2:
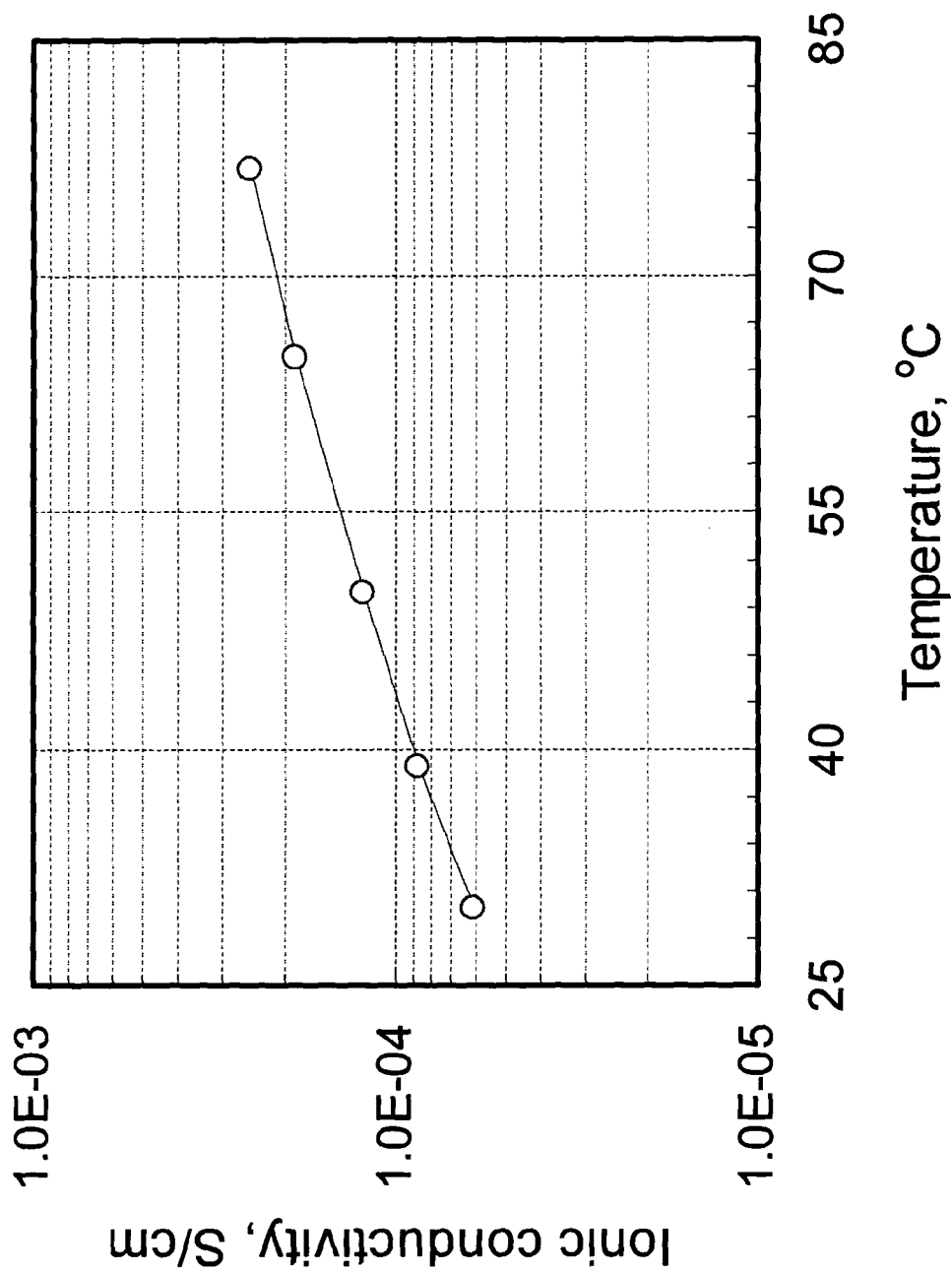
FIG. 2 is a plot of temperature vs. conductivity for cyclic poly(siloxane-g-3 ethylene oxide) electrolyte. LiTFSi was used as a lithium salt.

FIG. 2 shows an ionic conductivity versus temperature curve for an electrolyte having the cyclic polysiloxane of Example 1 (wherein n=4, p=0, R and R'=CH$_3$, R$_2$=CH$_2$CH$_2$CH$_2$) and LiN(SO$_2$CF$_3$) mixed at a ratio of [EO]/[Li]=32:1, where [EO] is the number of oxygen atom in the PEO chains. The ionic conductivities were determined from AC impedance curves of 2032 button cells assembled by injecting the electrolyte between two stainless steel discs with a Teflon O-ring (1/32 inch thick) to prevent short circuits. The measurement frequency range was from 1 MHz to 100 Hz. The electrolyte shows an ionic conductivity of about 1.13×10$^{-4}$ S/cm near 25° C. and increased conductivity with increased temperature.

Example 2

A cyclic polysiloxane was synthesized according to FIG. 1 with n equal to 5. The polysiloxane was synthesized with the same procedure as Example 1, a platinum catalyst and different precursors as follows: To a 250-mL flame-dried flask was added 1,3,5,7,9-pentamethylcyclopentasiloxane (D$_5^H$) (Gelest Inc., 24.0 g, 0.40 mol Si—H group), allyl terminated tri(ethylene glycol) methyl ether (97.92 g, 0.48 mol, 20% excess), and 60 μl platinum divinyltetramethyldisiloxane Pt(dvs) (Aldrich Chem. Co., 3% solution in xylene).

Example 3

A cyclic polysiloxane was synthesized according to FIG. 1 with n equal to 4. The polysiloxane was synthesized using the same procedure and precursors as for Example 1 and a different catalyst as follows: To a 250-mL flame-dried flask was added 1,3,5,7-tetramethylcyclotetrasiloxane (D$_4^H$) (Gelest, 12.0 g, 0.20 mol Si—H group), allyl terminated tri(ethylene glycol) methyl ether (44.88 g, 0.22 mol, 10% excess) and 100 μl dicyclopentadiene platinum(II) dichloride (white powder from Strem Chemicals, Inc., 3% solution in dichloromethane made in the lab).

Example 4

A solid electrolyte could be prepared so as to include the cyclic polysiloxane of Example 1 entrapped in a network polymer synthesized from poly(alkylene glycol) dimethacrylate. A precursor solution would be prepared by mixing the cyclic polysiloxane, a poly(ethylene glycol) dimethacrylate, a control monomer according to General Formula VIII, benzoyl peroxide, and LiN(SO$_2$CF$_3$)$_2$ (LiTFSI). A solid electrolyte could be formed by curing the precursor solution at 70° C. for 2 hrs. This synthesis procedure is modeled after the interpenetrating polymerization technique described in detail in U.S. patent application Ser. No. 10/104,352, filed on Mar. 22, 2002, entitled "Solid Polymer Electrolyte and Method of Preparation" and incorporated herein by reference in its entirety.

Example 5

A stable electrolyte having an interpenetrating network could be prepared so as to entrap the cyclic polysiloxane of Example 1 inside a network polysiloxane. A precursor solution would be prepared by mixing the cyclic polysiloxane, a linear precursor polysiloxane having a structure according to General Formula V, a compound terminated with two or more allyl groups, a platinum catalyst, and a salt. The network polysiloxane could be formed by reacting the linear precursor polysiloxane with the allyl-terminated compound, using a hydrosilylation reaction as disclosed in U.S. patent application Ser. No. 10/367,013, filed Feb. 13, 2003, entitled "Crosslinked Polysiloxanes" as described above. In the linear precursor for this example, R is an alkyl group; R' is an alkyl or an aryl group; R'" is an alkyl group or a hydrogen; R$_1$ is an alkyl group or a hydrogen; R$_2$ is a spacer made up of one or more CH$_2$ groups; m is from 1 to 100; n is greater than 0; and x is from 1 to 30. The compound terminated with two or more allyl groups may comprise a compound such as a diallyl terminated poly(alkylene glycol) or diallyl terminated polysiloxane. The final interpenetrating network polymer electrolyte would be synthesized as was outlined in Example 4.

Example 6

A cyclic polysiloxane was prepared having a structure according to General Formula III with R, R' and R'" as methyl groups, R$_1$ as hydrogen; R$_2$ as a spacer including three CH$_2$ groups; x as 3; and n+p of 4 with an approximate n:p ratio on the order of 1:1.

To a 50-mL three-necked flame-dried flask was added 7.5 g of distilled 1,3,5,7-tetramethylcyclotetrasiloxane (D$_4^H$) (Gelest, 12.0 g, 0.125 mol Si—H bonds). A 20 mL syringe was employed to inject 12.75 g of tri(ethyleneglycol) allyl methyl ether (0.0625 mol) into the flask. The reaction system was filled with dry N$_2$ and heated to about 60° C. 20 μL solution of platinum divinyltetramethyldisiloxane (Pt(dvs)) (Aldrich, 3% solution in xylene) was syringed into the above mixture. The result was stirred for about 12 hours until tri (ethyleneglycol) allyl methyl ether was not evident by $^1$H-NMR. The result was vacuum distilled to remove isomers formed during the hydrosilylation.

Example 7

The cyclic polysiloxane of Example 6 was cross-linked. The polysiloxane generated according to Example 6 (2.0 g, 6.16×10$^{-3}$ mol Si—H bonds), 2.09 g of diallyl terminated poly(ethylene glycol) cross-linking agent (APEO13A, 3.08×10$^{-3}$ mol), and 6 μL of dicyclopentadiene platinum(II) dichloride (3% in dichloromethane) were mixed in a 10 ml flask. The result was put under vacuum to remove moisture and then placed in an 80° C. oven. After about 12 hours in the oven, the result was gelled into a solid cross-linked polysiloxane.

Example 8

A cyclic polysiloxane was prepared having a structure according to General Formula III with R, R', and R'" as methyl groups; R$_1$ as hydrogen; R$_2$ as a spacer including three CH$_2$ groups; x as 3; and n+p of 5 with an approximate n:p ratio on the order of 5:3.

To a 100-mL three-necked flame-dried flask was added 15 g of distilled 1,3,5,7,9-pentamethylcyclopentasiloxane (D$_5^H$) (Gelest, 0.25 mol Si—H bonds). A 20-mL syringe was employed to inject 30.6 g of tri(ethyleneglycol) allyl methyl ether (0.15 mol) into the flask. The reaction system was filled with dry $N_2$ and heated to about 60° C. 20 μL solution of platinum divinyltetramethyldisiloxane (Pt(dvs)) (Aldrich, 3% solution in xylene) was syringed into the above mixture. The result was stirred for about 12 hours until tri(ethyleneglycol) allyl methyl ether was not evident by $^1$H-NMR. The result was vacuum distilled to remove isomers formed during the hydrosilylation.

Example 9

The cyclic polysiloxane of Example 8 was cross-linked. The polysiloxane generated according to Example 8 (1.0 g, $2.19 \times 10^{-3}$ mol Si—H bonds), 0.7454 g of diallyl terminated poly(ethylene glycol) cross-linking agent (APEO13A, $1.09 \times 10^{-3}$ mol), and 10 μL of platinum divinyltetramethyldisiloxane (Pt(dvs)) (Aldrich, 3% solution in xylene) were mixed in a 10-ml flask. The result was put under vacuum to remove moisture and then placed in an 80° C. oven. After about 16 hours in the oven, the result was gelled into a solid cross-linked polysiloxane.

Example 10

A cyclic polysiloxane was cross-linked so as to provide a polysiloxane according to General Formula II with R, R' and R'" as methyl groups; $R_1$ as hydrogen; $R_2$ as a spacer made up of three $CH_2$ groups; x of 3; p+n of 5; a p:n ratio of 2.8:2.2; and Q as —$CH_2$—$CH_2$—$CH_2$—$R_3$—$CH_2$—$CH_2$—$CH_2$— with $R_3$ as O—$(CH_2CH_2O)_q$ and q as 13. The cyclic polysiloxane was synthesized using a hydrosilylation reaction between a precursor polysiloxane and an allyl terminated cross-linking agent. The precursor polysiloxane had a structure according to General Formula III with R, R' and R'" as methyl groups; $R_1$ as hydrogen; $R_2$ as a spacer made up of three $CH_2$ groups; p+n of 5; and a ratio of p:n of 2.8:2.2.

The polysiloxane precursor (2.0 g, $5.05 \times 10^{-3}$ mol Si—H) was added into a dry 50 mL flask. Diallyl poly(ethylene glycol) cross-linker (q ~13) (1.72 g, $2.52 \times 10^{-3}$ mol), LiN$(CF_3SO_2)_2$ ($3.05 \times 10^{-3}$ mol, 38 mL of 0.0805 mol/L THF solution) and dicyclopentadiene platinum (II) dichloride (200 μL $7.5 \times 10^{-3}$ M $CH_2Cl_2$ solution) were syringed into the flask, and a clear solution was obtained. A vacuum was pulled on the solution for 12 h and then the solution was further evacuated on a high-vacuum line ($\sim 10^{-5}$ torr) for 48 h to completely remove the THF. The flask was sealed and transferred into a glove-box, where the viscous mixture was loaded into the conductivity measurement cell. After at least 2 h in an 80° C. oven, a solid gel resulted. IR does not show any Si—H absorbance at 2100 cm$^{-1}$ area, indicating that the cross-linking reaction is complete.

Example 11

A cyclic polysiloxane was cross-linked so as to provide a polysiloxane according to General Formula II with R, R' and R'" as methyl groups; $R_1$ as hydrogen; $R_2$ as a spacer made up of three $CH_2$ groups; x of 3; p+n of 5 and a p:n ratio of 3.2:1.8 and Q as —$CH_2$—$CH_2$—$CH_2$—$R_3$—$CH_2$—$CH_2$—$CH_2$— with $R_3$ as O—$(CH_2CH_2O)_q$ and q of 13. The cyclic polysiloxane was synthesized using a hydrosilylation reaction between a precursor polysiloxane and an allyl terminated cross-linking agent. The precursor polysiloxane had a structure according to General Formula III with R, R' and R'" as methyl groups; $R_1$ as hydrogen; $R_2$ as a spacer made up of three $CH_2$ groups; p+n of 5; and a ratio p:n of 3.2:1.8.

The polysiloxane precursor (2.0 g, $5.05 \times 10^{-3}$ mol Si—H) was added into a dry 50 mL flask. Diallyl poly(ethylene glycol) cross-linking agent (1.72 g, $2.52 \times 10^{-3}$ mol), LiN$(CF_3SO_2)_2$ ($3.05 \times 10^{-3}$ mol, 38 mL of 0.0805 mol/L THF solution) and dicyclopentadiene platinum (II) dichloride (200 μL $7.5 \times 10^{-3}$ M $CH_2Cl_2$ solution) were syringed into the flask, and a clear solution was obtained. A vacuum was pulled on the solution for 12 h and then the solution was further evacuated on a high-vacuum line ($\sim 10^{-5}$ torr) for 48 h to completely remove the THF. The flask was sealed and transferred into a glove box where the viscous mixture was loaded into the conductivity measurement cell. After at least 2 h in an 80° C. oven, a solid gel resulted. IR does not show any Si—H absorbance at 2100 cm$^{-1}$ area, indicating that the cross-linking reaction is complete.

Although the electrolyte is disclosed in the context of an electrolyte having a single cyclic polysiloxane, the electrolyte can include a plurality of cyclic polysiloxanes having different structures.

The electrolytes described above can be applied in electrochemical devices such as batteries and capacitors in the same way as common carbonate-based electrolytes and other polysiloxane based electrolytes. In some instances, the electrolytes are employed in lithium secondary batteries solutions. Lithium secondary batteries employing the above electrolytes can be fabricated by injecting the polymeric electrolyte solution into a spiral wound cell or prismatic type cell (laminated, Z-fold, etc.). It can also be coated onto the surface of electrodes and assembled with a porous separator to fabricate a single or multi-stacked cell that is packaged in a plastic or plastic/foil laminated pouch. Additionally, the electrolyte of the present invention can be mixed with the active material, the binder, and the electronic additive (a conductor typically made from graphite, carbon black, acetylene black, or other carbonaceous material) to form a slurry and then cast the slurry with an embedded current collector to obtain a composite electrode after drying.

Although many of the electrolyte features such as salt concentrations and molecular weights are described in the context of a liquid electrolyte, these features can also be applied to solid electrolytes as well.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. An electrochemical device, comprising: an electrolyte including a cyclic polysiloxane having side chains that each includes a poly(alkylene oxide) moiety and a spacer positioned between the poly(alkylene oxide) moiety and a silicon on a main chain of the polysiloxane, the polysiloxane having a structure represented by the formula:

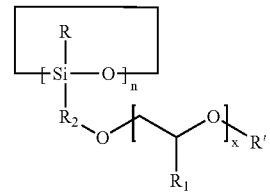

wherein R is an alkyl or aryl group; R' is an alkyl or aryl group; $R_1$ is hydrogen or an alkyl group; $R_2$ represents the spacer and consists of one or more $CH_2$ groups; n is 4 to 100; and x is up to 30.

2. The device of claim 1, wherein the spacer includes 2 or more $CH_2$ groups.

3. The device of claim 1, wherein the spacer includes 6 or fewer $CH_2$ groups.

4. The device of claim 1, wherein the cyclic polysiloxane is cross-linked.

5. The device of claim 1, wherein the electrolyte is a liquid.

6. The device of claim 1, wherein the electrolyte includes at least one alkali metal salt.

7. The device of claim 6, wherein the alkali metal salt is selected from a group consisting of: $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$), lithium alkyl fluorophosphates, lithium bis(chelato)borates, $LiPF_3(C_2F_5)_3$, and $LiPF_3(CF_3)_3$.

8. The device of claim 1, wherein the electrolyte includes a lithium bis(chelato)borate having 5 to 10 membered rings.

9. The device of claim 1, wherein the electrolyte includes a lithium bis(chelato)borate having 5 to 7 membered rings.

10. The device of claim 1, wherein the cyclic polysiloxane is entrapped within at least one cross-linked network polymer.

11. The device of claim 10, wherein the electrolyte is a solid.

12. The device of claim 10, wherein the at least one network polymer includes a poly(methacrylate).

13. The device of claim 10, wherein the network polymer is formed from a monomer represented by general formula:

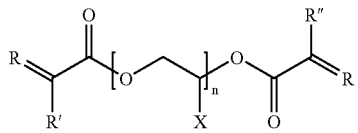

wherein R is an alkyl group having 1 to 10 carbon atoms; each of R' and R" is selected from the group consisting of: hydrogen, an alkyl group having 1 to 10 carbon atoms, and an alkenyl group having 2 to 12 carbon atoms; X is hydrogen or a methyl group; and n is 1 to 15.

14. The device of claim 10, wherein the network polymer includes a cross-linked polysiloxane.

15. The device of claim 10, wherein the network polymer includes a polysiloxane where at least a portion of the main chain silicons are linked to side chains that each include a poly(alkylene oxide) moiety.

16. The device of claim 15, wherein at least a portion of the main chain silicons are bonded to a cross-linker having a moiety selected from the group consisting of: O—$(CH_2CH_2O)_q$ and Si—O—$(Si—O)_k$—Si, where q is at least 4 and less than 30, and k is at least 5 and less than 30.

17. The device of claim 15, wherein n of the main chain silicons are bonded to a cross-linker and m of the main chain silicons bonded to a side chain, a ratio of n:m being in a range of 1:4 to 1:200.

18. The device of claim 17, wherein the ratio of n:m is in a range of 1:6 to 1:100.

19. The device of claim 1, wherein the electrolyte further includes:
at least one solid polymer.

20. The device of claim 19, wherein the at least one solid polymer is selected from the group consisting of: polyacrylonitrile (PAN), poly(methyl methacrylate) (PMMA), poly(vinylidene fluoride) (PVdF), poly(vinylidene fluoride-co-hexafluoropropylene), poly(vinyl acetate), polystyrene, and poly(ethylene oxide) (PEO).

21. The device of claim 1, wherein the average molecular weight of the cyclic polysiloxane is less than or equal to 20,000 g/mol.

22. The device of claim 1, wherein the dynamic viscosity of the cyclic polysiloxane is less than or equal to 10,000 cps.

23. The device of claim 1, wherein a [EO]/[Li] ratio is 5 to 50,
[EO] being a molar concentration in the electrolyte of active oxygens in the polysiloxane, and
[Li] being a molar concentration of the lithium in the electrolyte.

24. The device of claim 1, further comprising:
at least one lithium metal oxide cathode, at least one porous separator, and at least one anode.

25. The device of claim 24, wherein the at least one anode comprises at least one material selected from the group consisting of: carbon and lithium metal.

26. The device of claim 1, wherein the electrolyte includes a blend of polysiloxanes.

27. The device of claim 1, wherein the spacer includes 3 or more $CH_2$ groups.

28. The device of claim 1, wherein $R_1$ is hydrogen.

29. The device of claim 1, wherein the electrolyte further includes a polysiloxane having a structure represented by the formula:

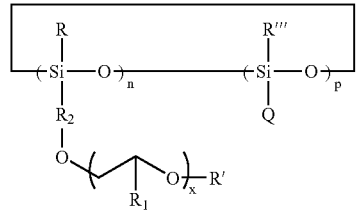

wherein R is an alkyl group, R' is an alkyl or aryl group, R''' is alkyl or hydrogen; $R_1$ is hydrogen or an alkyl group; $R_2$ is a spacer made up of one or more $CH_2$ groups; p is greater than 0; n is from 1 to 100; x is from 1 to 30; and Q is a cross-linker linking the polysiloxane to another polysiloxane.

30. The device of claim 29, wherein the electrolyte is a solid.

31. The device of claim 29, wherein at least a portion of the cross-linkers include a moiety selected from the group consisting of O—$(CH_2CH_2O)_q$ and Si—O$(Si—O)_k$—Si, where q is at least 4 and less than 30, and k is at least 5 and less than 30.

32. An electrochemical device, comprising: an electrolyte including a cyclic polysiloxane having side chains that each includes a poly(alkylene oxide) moiety and a spacer positioned between the poly(alkylene oxide) moiety and a silicon on a main chain of the polysiloxane,
the polysiloxane having a structure represented by a formula that includes the variables R, R', $R_1$, $R_2$, n, and x;
the variable R representing an alkyl or aryl group;
the variable R' representing an alkyl or aryl group;
the variable $R_1$ representing hydrogen or an alkyl group;
the variable $R_2$ representing the spacer and consisting of one or more $CH_2$ groups;
the variable n being 4 to 100;
the variable x being 1 to 30; and
the formula being

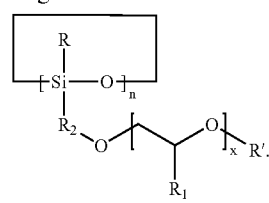

* * * * *